United States Patent
Sujan et al.

(10) Patent No.: US 8,688,302 B2
(45) Date of Patent: Apr. 1, 2014

(54) HYBRID POWER SYSTEM BRAKING CONTROL

(75) Inventors: Vivek Anand Sujan, Columbus, IN (US); Patrick Djan-Sampson, Columbus, IN (US); Martin T. Books, Columbus, IN (US); Morgan Andreae, Columbus, IN (US)

(73) Assignee: Cummins Inc., Columbus, IN (US)

( * ) Notice: Subject to any disclaimer, the term of this patent is extended or adjusted under 35 U.S.C. 154(b) by 539 days.

(21) Appl. No.: 12/983,015

(22) Filed: Dec. 31, 2010

(65) Prior Publication Data
US 2012/0173060 A1 Jul. 5, 2012

(51) Int. Cl.
*B60L 11/00* (2006.01)
*B60L 3/00* (2006.01)
*B60W 20/00* (2006.01)

(52) U.S. Cl.
USPC ............. 701/22; 180/65.27; 903/903; 701/70

(58) Field of Classification Search
USPC ......... 701/22, 70; 180/65.265, 65.275, 65.28, 180/65.285, 65.31, 65.27; 903/903
See application file for complete search history.

(56) References Cited

U.S. PATENT DOCUMENTS

| | | | |
|---|---|---|---|
| 4,015,182 A | 3/1977 | Erdman | |
| 4,021,677 A | 5/1977 | Rosen et al. | |
| 4,171,029 A | 10/1979 | Beale | |
| 4,643,147 A * | 2/1987 | Staerzl | 123/676 |
| 5,172,006 A | 12/1992 | Suzuki et al. | |
| 5,345,154 A | 9/1994 | King | |
| 5,406,154 A | 4/1995 | Kawaguchi et al. | |
| 5,542,754 A | 8/1996 | Aoki et al. | |
| 6,321,144 B1 | 11/2001 | Crombez | |
| 6,445,982 B1 | 9/2002 | Swales et al. | |
| 6,574,535 B1 * | 6/2003 | Morris et al. | 701/22 |
| 6,616,570 B2 | 9/2003 | Wakashiro et al. | |
| 6,629,024 B2 | 9/2003 | Tabata et al. | |
| 6,705,686 B2 | 3/2004 | Hilbert | |
| 6,719,076 B1 | 4/2004 | Tabata et al. | |
| 6,755,489 B2 | 6/2004 | Kuno et al. | |
| 6,806,663 B2 | 10/2004 | Kusaka et al. | |
| 6,846,265 B2 | 1/2005 | Yamamoto et al. | |
| 6,945,905 B2 | 9/2005 | Tamai et al. | |
| 6,966,803 B2 | 11/2005 | Hara et al. | |
| 7,012,392 B2 | 3/2006 | Nguyen et al. | |
| 7,028,793 B2 | 4/2006 | Hu et al. | |
| 7,034,482 B2 | 4/2006 | Komiyama et al. | |

(Continued)

FOREIGN PATENT DOCUMENTS

| | | |
|---|---|---|
| DE | 10246839 | 4/2004 |
| JP | 2003235287 | 8/2003 |
| WO | 2004052671 | 6/2004 |
| WO | 2010098881 | 9/2010 |

OTHER PUBLICATIONS

International Searching Authority. International Search Report and Written Opinion. PCT Patent Application PCT/US2011/067676. Feb. 1, 2013.

*Primary Examiner* — Yonel Beaulieu
(74) *Attorney, Agent, or Firm* — Krieg DeVault LLP

(57) ABSTRACT

A method, apparatus, and system are disclosed for hybrid power system braking. In one embodiment, a deceleration input is received. In response to receiving the deceleration input, a target negative torque trajectory is determined. To achieve the target negative torque trajectory, a regenerative braking device and an electrical energy dissipation device are activated.

27 Claims, 2 Drawing Sheets

(56) References Cited

U.S. PATENT DOCUMENTS

| | | | |
|---|---|---|---|
| 7,089,095 B2 | 8/2006 | Takami et al. | |
| 7,122,979 B2 | 10/2006 | Wilton et al. | |
| 7,131,708 B2 | 11/2006 | Tao et al. | |
| 7,163,487 B2 | 1/2007 | Tao et al. | |
| 7,222,013 B2 | 5/2007 | Hsieh et al. | |
| 7,236,871 B2 | 6/2007 | Sah et al. | |
| 7,275,795 B2 | 10/2007 | Nishina et al. | |
| 7,284,803 B2 | 10/2007 | Matsuura et al. | |
| 7,379,797 B2 | 5/2008 | Nasr et al. | |
| 7,395,887 B2 | 7/2008 | Viergever et al. | |
| 7,420,339 B2 | 9/2008 | Chung et al. | |
| 7,436,150 B2 * | 10/2008 | Daboussi | 320/118 |
| 7,458,650 B2 | 12/2008 | Toyota et al. | |
| 7,493,980 B2 | 2/2009 | Hidaka | |
| 7,562,944 B2 | 7/2009 | Walker | |
| 7,610,974 B2 | 11/2009 | Abe | |
| 7,615,947 B2 | 11/2009 | Tamaoka | |
| 7,647,997 B2 | 1/2010 | Oliver | |
| 7,908,067 B2 | 3/2011 | Soliman et al. | |
| 8,074,505 B2 * | 12/2011 | Foster et al. | 73/114.69 |
| 2002/0101081 A1 | 8/2002 | Jockel | |
| 2003/0184152 A1 | 10/2003 | Cikanek et al. | |
| 2004/0164612 A1 | 8/2004 | Worrel | |
| 2005/0005814 A1 | 1/2005 | Kumar et al. | |
| 2005/0017580 A1 | 1/2005 | Cikanek et al. | |
| 2005/0143877 A1 | 6/2005 | Cikanek et al. | |
| 2005/0255965 A1 * | 11/2005 | Tao et al. | 477/4 |
| 2007/0137906 A1 | 6/2007 | Seminara et al. | |
| 2007/0158945 A1 * | 7/2007 | Annen et al. | 290/1 A |
| 2008/0048597 A1 | 2/2008 | Tamaoka | |
| 2008/0295493 A1 * | 12/2008 | Applegate et al. | 60/286 |
| 2008/0314661 A1 | 12/2008 | Soliman et al. | |
| 2008/0314663 A1 | 12/2008 | Yamazaki et al. | |
| 2008/0314664 A1 | 12/2008 | Mueller et al. | |
| 2008/0318728 A1 | 12/2008 | Soliman et al. | |
| 2009/0118920 A1 | 5/2009 | Heap et al. | |
| 2009/0145673 A1 | 6/2009 | Soliman et al. | |
| 2009/0295253 A1 | 12/2009 | Yarger et al. | |
| 2010/0056325 A1 | 3/2010 | Kahn et al. | |
| 2010/0168976 A1 | 7/2010 | Andrasko et al. | |
| 2010/0283347 A1 | 11/2010 | Caines | |

* cited by examiner

HYBRID POWER SYSTEM BRAKING CONTROL

BACKGROUND

Environmental concerns and limited natural resources are highlighting the desire for reduced fuel consumption. One promising avenue toward the reduction of fuel consumption is the use of hybrid powertrains. Many hybrid powertrains utilize regenerative braking to increase the overall efficiency of the system. Regenerative braking recovers kinetic energy from a moving vehicle and utilizes the recovered energy to store electrical potential energy. In presently available hybrid powertrain systems, when a battery to store the energy has reached the currently available storage capacity, the braking capability of the regenerative braking system is reduced. The resulting braking power fluctuation may result in driver dissatisfaction or in a generally lower driver reliance on the regenerative braking system. Therefore, further technological developments are desirable in this area.

SUMMARY

One embodiment is a unique method for hybrid power system braking control. Other embodiments include unique methods, systems, and apparatus to achieve a consistent negative torque trajectory. Further embodiments, forms, objects, features, advantages, aspects, and benefits shall become apparent from the following description and drawings.

DESCRIPTION OF THE ILLUSTRATIVE EMBODIMENTS

Figure 1:
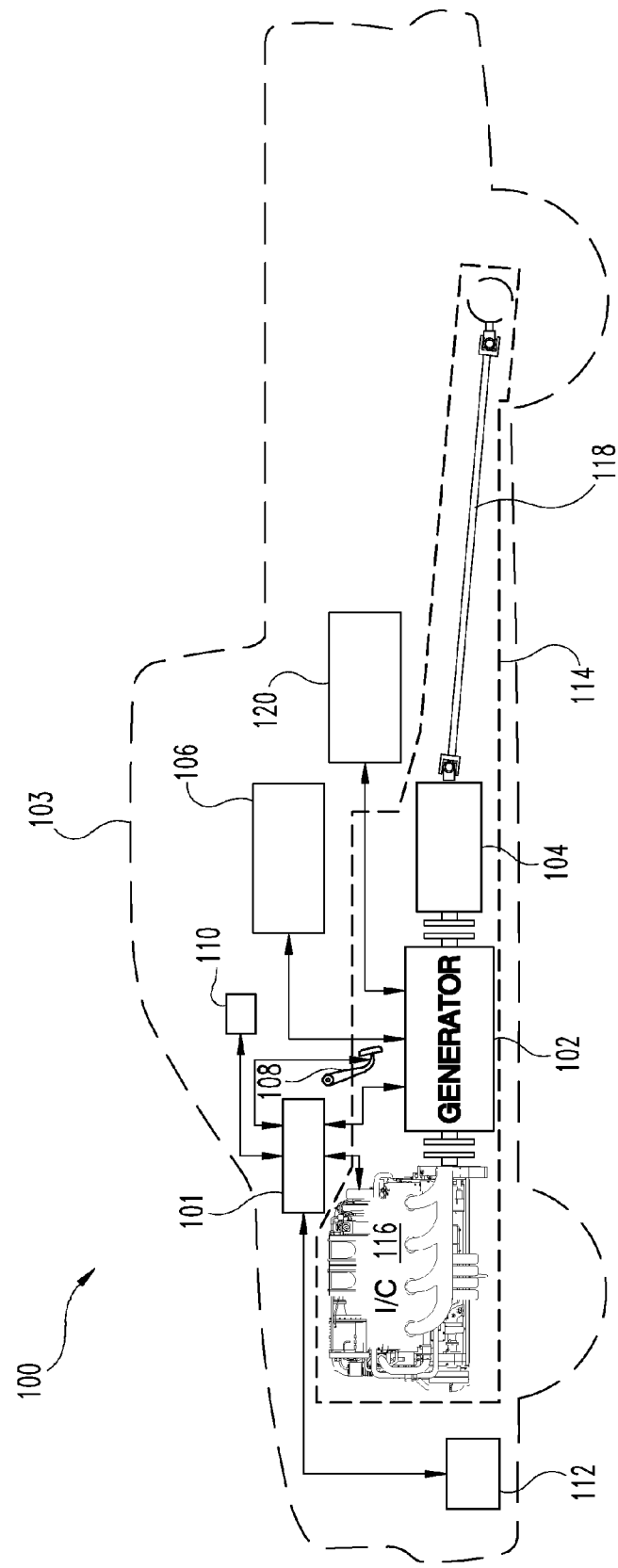
FIG. 1 is a schematic block diagram for hybrid power system braking control.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram for hybrid power system braking control. One embodiment of a system 100 for negative torque control is depicted in FIG. 1. A vehicle 103 has a powertrain 114. The powertrain 114 includes an internal combustion engine 116 selectively coupled to a generator 102, the internal combustion engine 116 and the generator 102 being selectively coupled to a transmission 104 to drive a driveshaft 118. In some applications, the internal combustion engine 116 may be a diesel engine. The generator 102 may also be a motor/generator as is common in hybrid applications. An electrical energy storage device 106 is electrically connected to the generator 102 to store electricity generated by the generator 102. The electrical energy storage device 106 can be a battery such as a lithium ion battery, a lead-acid battery, a nickel metal hydride battery, or any other device capable of storing electrical energy. In certain embodiments, energy may be stored non-electrically, for example in a high performance fly wheel, in a compressed air tank, and/or through deflection of a high capacity spring. Where the energy is stored electrically, any electrical energy storage device 106 is contemplated herein, including a hyper-capacitor and/or an ultra-capacitor.

A passive resistor bank 120, also electrically connected to the generator 102, is designed to convert a portion of the electrical energy generated by the generator 102 into heat energy. The heat energy provided by the passive resistor bank 120 may be dissipated to the ambient, dissipated to an available coolant stream (e.g. the engine coolant), and/or provided to a device for useful purposes including, without limitation, heating an exhaust stream upstream of a catalytic device or providing heat to a passenger compartment. The vehicle 103 is also equipped with a pedal position sensor 108 which determines a position of a brake pedal. In other applications, the vehicle 103 may be equipped with a brake system pressure sensor 112, which may detect a pressure anywhere in the brake system that can be correlated to braking effort, including pressure at a master cylinder, physical pressure applied to the brake pedal, and/or a pressure in a brake line associated with one or more brakes in the system. In some applications, the vehicle 103 may be equipped with a compression braking selector 110.

In certain embodiments, the system 100 further includes a controller 101 structured to perform certain operations to control the negative torque of the vehicle 103. In certain embodiments, the controller forms a portion of a processing subsystem including one or more computing devices having memory, processing, and communication hardware. The controller may be a single device or a distributed device, and the functions of the controller may be performed by hardware or software.

In certain embodiments, the controller includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 2:
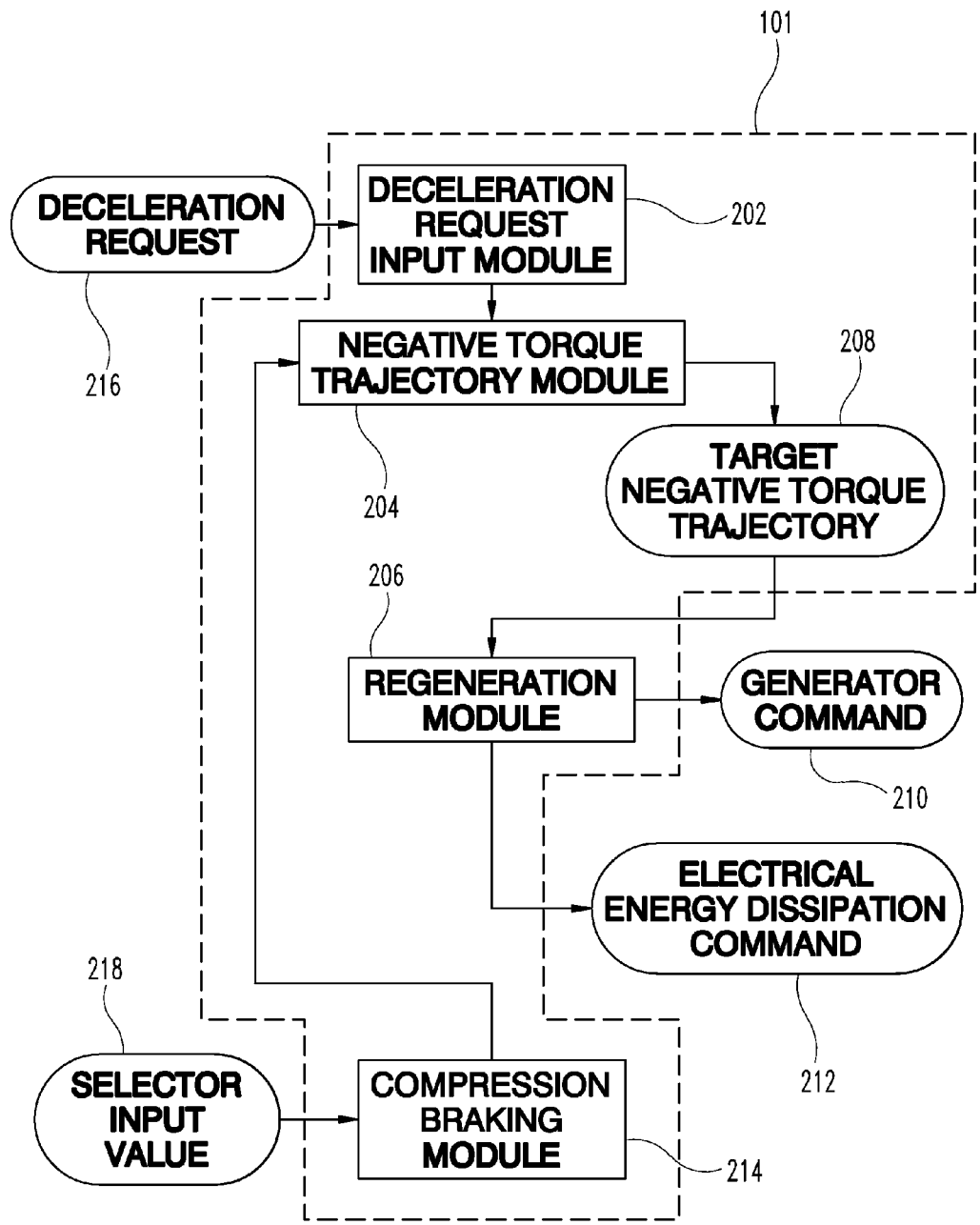
FIG. 2 is a schematic view of a controller that functionally executes certain operations for hybrid power system braking control.

FIG. 2 is a schematic view of a controller apparatus for hybrid power system braking control. The exemplary controller 101 includes a deceleration request input module 202, a negative torque trajectory module 204, a regeneration module 206, and a compression braking module 214. Specific embodiments of the controller 101 may omit certain modules or have additional modules, as will be understood by the description herein and the claims following.

In one embodiment of the present invention, the deceleration request input module 202 receives a deceleration request 216. Exemplary deceleration request 216 values include an accelerator pedal position being in a condition indicating a deceleration request 216—for example the accelerator pedal position within a low deadband position that is determined to be equivalent to a zero accelerator pedal position. The position of the accelerator pedal that is equivalent to a zero accelerator pedal position varies with the application and is understood to one of skill in the art. Exemplary positions include an accelerator pedal position lower than 10% of a maximum accelerator pedal position, or any other value including an accelerator pedal position lower than 30% of the maximum. In many applications, the percentage of "dead band" will be configurable by a vehicle manufacturer or an original equipment manufacturer (OEM). While the accelerator pedal position may be utilized to send a deceleration request 216, other non-limiting accelerator indicators may be used to determine the deceleration request 216, including an accelerator pressure or electronic drive by wire accelerator indication.

The controller 101 further includes a negative torque trajectory module 204 that determines a target negative torque trajectory 208 in response to the deceleration request 216. In certain embodiments, the negative torque trajectory module 204 utilizes an engine speed, a vehicle speed, and/or a engine or hybrid power train load to determine a target negative torque trajectory 208.

An exemplary operation includes the negative torque trajectory module 204 having a number of potential target negative torque trajectories 208 stored, and selecting from among the number of target negative torque trajectories 208 depending upon the value of the engine speed, vehicle speed, and/or engine or hybrid power train load. Another exemplary operation includes the negative torque trajectory module 204 adjusting a baseline target negative torque trajectory 208 with values from a look up table or tabulated set of values in response to the engine speed, vehicle speed, and/or engine or hybrid power train load. The look up table or tabulated set of values are referenced by utilizing a nearest value, an interpolated value, an extrapolated value, and/or a limited value at the end points of the table or tabulated values. The look up table or tabulated set of values may, additionally or alternatively, be referenced by any other operations understood in the art.

The target negative torque trajectory 208 is then communicated to the regeneration module 206. The controller 101 further includes a regeneration module 206 that provides a generator command 210 and/or an electrical energy dissipation command 212. The generator 102 is responsive to the generator command 210, and the electrical energy dissipation device is responsive to the electrical energy dissipation command 212. Accordingly, the regeneration module 206 provides commands 210, 212, and the generator and electrical energy dissipation device respond to the commands 210, 212, such that the target negative torque trajectory 208 is achieved. It is understood that, during transient events or at certain operating conditions, the generator and electrical energy dissipation device may be unable to achieve the instantaneous response required to achieve the target negative torque trajectory 208. In certain embodiments, operations of the controller 101 to smooth the torque response or to limit the torque outputs of the generator and/or electrical energy dissipation device to physically realizable limits, such that the target negative torque trajectory 208 is achieved over a brief period of operation are nevertheless understood to be operations to achieve the target negative torque trajectory 208.

The operations of the controller 101 thereby provide for a consistent braking torque for a given deceleration request 216, or for a given deceleration request 216 at a given set of operating conditions (e.g. vehicle speed, engine speed, etc.). Accordingly, the driver of a vehicle including the controller 101 is provided with a consistent regenerative braking response to consistent accelerator and service brake pedal operations.

An exemplary electrical energy dissipation device is a passive resistor bank (energy dissipation) 120. In utilizing a dissipative passive resistor bank 120, the generator 102 produces electrical energy from the vehicle's 103 kinetic energy, and at least a portion of the electrical energy is converted into heat energy through the dissipative passive resistor bank 120. In some embodiments, the passive resistor bank 120 dissipates heat to the engine coolant.

In other embodiments, in which the powertrain 114 consists of one electrical device having motor capability and one electrical device having generator capability (e.g. two motor/generators), the two electrical devices dissipate electrical energy, with one device operating as a motor in a negative torque mode and the other device operating as a generator and providing power to the motor. An exemplary system including two electrical devices is a combined series-parallel architecture with an intermediate clutch. A configuration including two electrical devices, accordingly, convert the kinetic energy of the vehicle into electrical energy, and dissipate the electrical energy.

An exemplary embodiment includes a single motor/generator utilized as an electrical energy dissipation device (motor dissipation). The single motor oscillates between a motoring mode and a generating mode. In the motoring mode, the motor extracts stored energy from the electrical energy storage device 106 and operates in a negative torque mode. The motor then switches to a generating state, converting the kinetic energy of the vehicle into electrical energy to be stored in the electrical energy storage device 106. Accordingly, the motor/generator provides negative torque to the driveline at all times during the braking, while successively charging and discharging the electrical energy storage device 106. The frequency of oscillation, and the charge levels of the electrical energy storage device 106 are selectable.

Yet another exemplary electrical energy dissipation device is a generator 102. The generator 102 charges the electrical energy storage device 106 at a variable efficiency value, where the variable efficiency value is either controllable and/or known during the operations of the system. As the electrical energy storage device 106 is charged, the generator 102 responds to an efficiency command to charge the electrical energy storage device 106 with a selectable efficiency. An exemplary efficiency adjustment operation includes reducing the charging efficiency of the generator as the electrical energy storage device 106 approaches a maximum charging capacity. Accordingly, a portion of the kinetic energy of the vehicle is turned into heat within the generator 102 and a portion of the kinetic energy of the vehicle is turned into electrical energy stored in the electrical energy storage device 106. Exemplary operations to adjust the efficiency of the generator 102 include adjusting the amperage in the coils of the generator 102 (e.g. for a generator 102 having an electromagnetic coil), adjusting the operating position of the generator 102 on an operational curve (e.g. where the efficiency of the generator 102 varies with generator speed and/or load), adjusting an operating temperature of the generator 102 (e.g. by adjusting a flow of coolant in thermal contact with the generator 102), or by any other method known to one of ordinary skill in the art to adjust generator efficiency.

In other embodiments, a vehicle includes compression brakes, and the controller 101 includes a compression braking module 214 that receives a selector input value 218. The negative torque trajectory module 204 further adjusts the negative torque trajectory 208 in response to the selector input value 218. In certain embodiments, the selector input value 218 includes an amount of compression braking requested. The selector input value 218 may consist of an on/off type switch (e.g. compression braking is presently enabled or disabled), a discrete selector switch (e.g. utilize 1, 2, 3, etc. number of cylinders for compression braking), and/or a continuous selector switch (e.g. a dial providing a continuous or smooth braking request between a low value and a high value of compression braking). An exemplary, non-limiting, on/off selection includes a switch typical in the industry for disabling engine braking within cities with noise ordinances. An exemplary continuous braking request input may be utilized, for example, in a system having variable valve timing such that the compression braking effort of individual cylinders is adjustable. The ability to respond to a compression braking request level allows for increased utilization of regenerative braking where the operator expects a strong braking response (e.g. from a high compression braking level) while providing the operator with a braking level that is still consistent with the expected strong braking response.

In certain embodiments, the negative torque trajectory module 204 further adjusts the target negative torque trajectory 208 in response to a service brake input value such as a service brake pedal 108 or brake system pressure 112. Accordingly, the target negative torque trajectory 208 is adjusted to provide greater regenerative braking in response to greater operator service braking, while providing a consistent negative braking torque for a consistent service braking effort.

In some embodiments of the present invention, the regenerative braking and energy dissipation devices include certain devices having modal behavior such as discrete available braking levels, and other devices having continuous or semi-continuous behavior. An exemplary operation includes a modal device providing a negative torque output, and a continuous device smoothing the negative torque output such that the system proceeds smoothly from one negative torque value to another negative torque value, or proceeds smoothly along the target negative torque trajectory 208. Exemplary modal devices include a motor/generator switching modes in the four quadrants (e.g. dithering between negative torque motoring and generating), compression braking with discrete numbers of cylinders performing the compression braking, and a variable geometry turbine (VGT) operating in a modal manner such as moving to a highly restrictive position where a discrete exhaust flow regime change occurs in the VGT. Exemplary continuous or semi-continuous devices include an exhaust throttle having smoothly varying positions, a VGT varying within an operating region where an exhaust flow regime change does not occur, a variably timed valve providing for smoothly variable braking effort from a given cylinder, and/or electrical operations with a motor/generator such as an actuator smoothly varying the current in the coil of a generator. The described modal and continuous devices are exemplary and non-limiting.

As is evident from the figures and text presented above, a variety of embodiments according to the present invention are contemplated.

In one embodiment of the present invention, in response to receiving a deceleration input, a target negative torque trajectory is determined. To achieve the target negative torque trajectory, a regenerative braking device in combination with an electrical energy dissipation device converts kinetic energy into electrical energy and heat energy. Should a service brake input be received, the target negative torque trajectory may be adjusted in response to the service brake input. In some embodiments, the target negative torque trajectory may be adjusted in response to a compression braking input.

In another embodiment of the present invention, a vehicle which performs intermittent deceleration (e.g. stops at various times) is operated. A target negative torque trajectory is determined in response to receiving a deceleration input. The target negative trajectory is then achieved by converting a portion of mechanical energy of the vehicle's drive system into electrical energy, storing a portion of the electrical energy and dissipating a portion of the electrical energy into heat energy.

In yet another embodiment of the present invention, regenerative braking is utilized throughout a braking event thereby providing a vehicle operator with a consistent pedal feel. Engine brakes, energy dissipation, motor-generator dissipation, motor dissipation, and generator efficiency dissipation are utilized in concert with regenerative braking to allow for the use of regenerative braking throughout a braking event. In a given braking event, it is contemplated that only regenerative braking will be utilized, that a combination of regenerative braking and service braking will be utilized, that a combination of regenerative braking and compression braking will be utilized, that a combination of regenerative braking and exhaust back pressure will be utilized, and many other combinations and permutations therein to allow consistent pedal feel to a vehicle operator.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
  receiving a deceleration input;
  in response to receiving the deceleration input, determining a target negative torque trajectory;
  activating a regenerative braking device and an electrical energy dissipation device in response to determining the target negative torque trajectory; and
  decelerating by decreasing an efficiency of the regenerative braking device to generate electrical energy and dissipating at least a portion of the generated electrical energy from the regenerative braking device as heat energy through the electrical energy dissipation device to achieve the target negative torque trajectory.

2. The method of claim 1, further comprising:
receiving a service brake input; and
in response to the service brake input, adjusting the target negative torque trajectory.

3. The method of claim 2, wherein the deceleration input is received from at least one of determining a pedal position and determining a brake system pressure.

4. The method of claim 1, wherein the electrical energy dissipation device is a device selected from the group of electrical energy dissipation devices consisting of passive resistors, motors, and generators.

5. The method of claim 4, wherein the regenerative braking device is a generator and decreasing the efficiency of the generator includes decreasing an amperage in a coil in the generator.

6. The method of claim 1, wherein determining the target negative torque trajectory further comprises interpreting a tabulated value.

7. The method of claim 1, further comprising smoothing deceleration by modulating exhaust back pressure.

8. The method of claim 1, further comprising smoothing deceleration by activating a compression brake having variable valve timing.

9. The method of claim 1, further comprising:
receiving a compression braking input; and
in response to the compression braking input, adjusting the target negative torque trajectory.

10. A method, comprising:
operating a vehicle having a drive system, the vehicle performing intermittent deceleration;
receiving a deceleration input;
in response to the deceleration input, determining a target negative torque trajectory;
achieving the target negative torque trajectory by converting a portion of mechanical energy of the drive system into electrical energy; and
wherein achieving the target negative torque trajectory includes storing a first portion of the electrical energy into an electrical storage device while dissipating a second portion of the electrical energy into heat energy.

11. The method of claim 10, wherein the deceleration input is received from one of determining a pedal position and determining a braking system pressure.

12. The method of claim 10, further comprising determining the target negative torque trajectory from at least one of a vehicle speed and an engine speed.

13. The method of claim 10, further comprising:
receiving a compression braking input; and
in response to the compression braking input, adjusting the target negative torque trajectory.

14. The method of claim 10, wherein dissipating the second portion of the electrical energy into heat energy further comprises:
operably coupling a motor to the drive system; and
oscillating the motor between a motoring mode and a generating mode.

15. The method of claim 14, the motoring mode further comprising extracting electrical power from an electrical storage device and powering the motor in a negative torque mode.

16. The method of claim 10, further comprising operating a continuous device to smooth a response in a modal device, the modal device contributing a negative torque.

17. An apparatus, comprising:
a controller structured to receive a deceleration input, the controller including:
a negative torque trajectory module structured to determine a target negative torque trajectory in response to the deceleration input; and
a regeneration command module structured to command a regenerative braking device and an energy dissipation device to achieve the target negative torque trajectory by decreasing an efficiency of the regenerative braking device to generate electrical energy and dissipating at least a portion of the generated electrical energy from the regenerative braking device as heat energy through the electrical energy dissipation device.

18. The apparatus of claim 17, wherein the controller is configured to operate a continuous device to smooth a response in a modal device, the modal device contributing a negative torque.

19. The apparatus of claim 17, wherein the controller is configured to adjust the target negative torque trajectory in response to a service brake input.

20. The apparatus of claim 17, wherein the controller is configured to adjust the target negative torque trajectory in response to a compression brake input.

21. A system, comprising:
a powertrain including an internal combustion engine, an energy dissipation device, and a generator;
a controller in communication the engine, the energy dissipation device, and the generator, the controller further comprising:
a deceleration request input module structured to receive a deceleration request;
a negative torque trajectory module structured to determine a target negative torque trajectory in response to the deceleration request; and
a regeneration module structured to provide a generator command and an electrical energy dissipation command to achieve the negative torque trajectory; and
wherein the generator is responsive to the generator command to generate electrical energy to decelerate the power train and the electrical energy dissipation device is responsive to the electrical energy dissipation command to dissipate at least a portion of the generated electrical energy as heat energy.

22. The system of claim 21, wherein the internal combustion engine is a diesel engine and the generator is a motor/generator.

23. The system of claim 21, wherein the generator is operably coupled to an electrical energy storage device selected from the group of electrical energy storage devices consisting of lithium ion batteries, lead-acid batteries, and a nickel metal hydride batteries.

24. The system of claim 21, wherein at least one of a variable geometry turbocharger, exhaust brake, and exhaust throttle are operably coupled to the internal combustion engine being structured to smooth modal responses.

25. The system of claim 21, further comprising a compression braking module further structured to receive a selector input value, wherein the negative torque trajectory module further determines the target negative torque trajectory in response to the selector input value.

26. The system of claim 21, the electrical energy dissipation device being selected from the energy dissipation devices consisting of passive resistor banks, motor-generator dissipation, motor dissipation, and generator efficiency.

27. The system of claim 21, wherein the controller is configured to adjust the efficiency of the generator.

* * * * *